M. M. & C. M. MATSON.
MOTOR.
APPLICATION FILED OCT. 22, 1917.

1,273,079.

Patented July 16, 1918.
2 SHEETS—SHEET 1.

Inventors
Martin M. Matson
Charles M. Matson

By Mason Fenwick Lawrence,
Attorneys

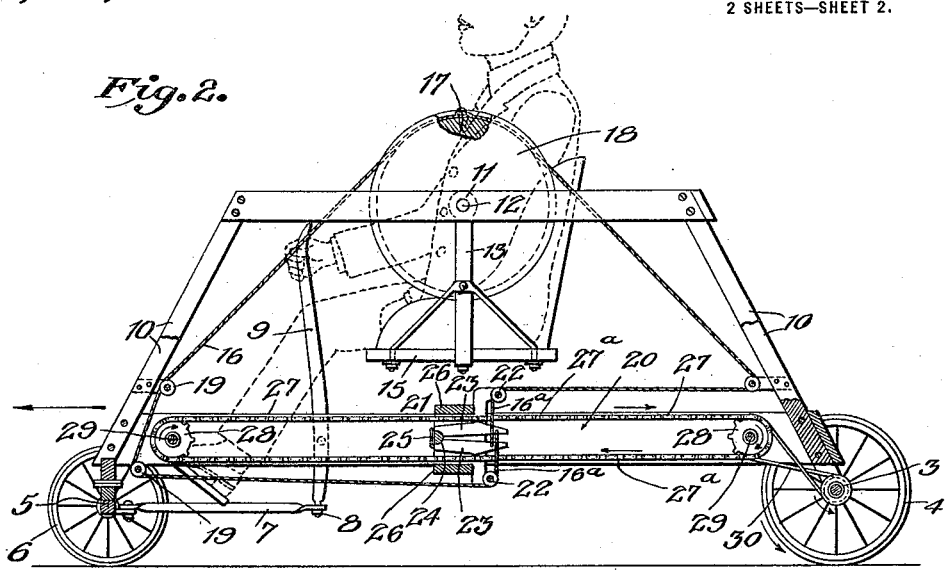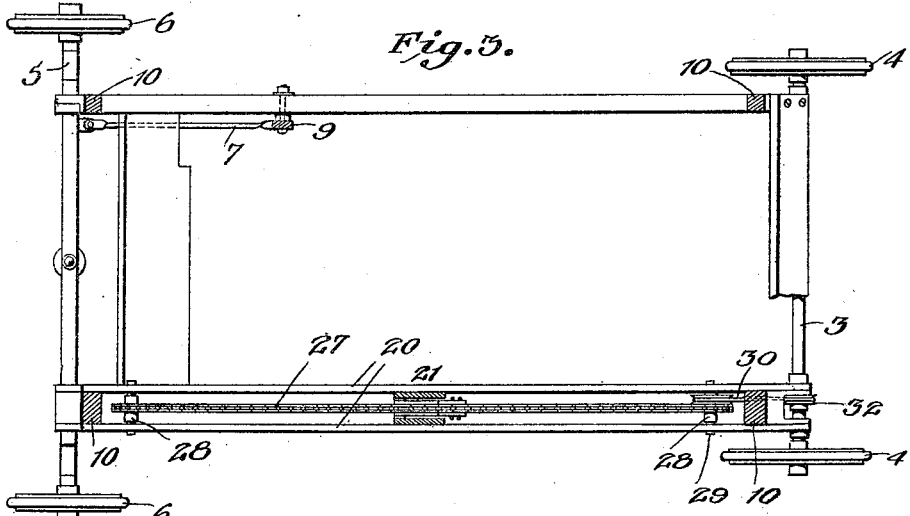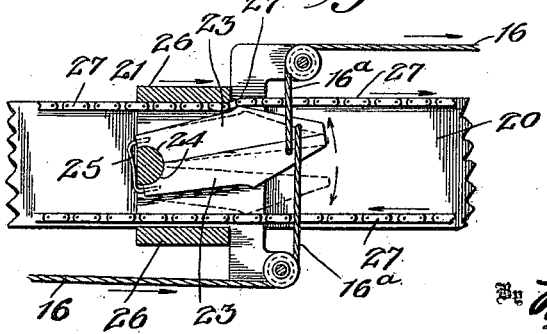

UNITED STATES PATENT OFFICE.

MARTIN M. MATSON AND CHARLES M. MATSON, OF MABSCOTT, WEST VIRGINIA.

MOTOR.

1,273,079.　　　　Specification of Letters Patent.　　Patented July 16, 1918.

Application filed October 22, 1917. Serial No. 198,000.

*To all whom it may concern:*

Be it known that we, MARTIN M. MATSON and CHARLES M. MATSON, citizens of the United States, residing at Mabscott, in the county of Raleigh and State of West Virginia, have invented certain new and useful Improvements in Motors; and we do hereby declare the following to be a full, clear, and exact description of the invention, such as will enable others skilled in the art to which it appertains to make and use the same.

This invention relates to vehicles and more particularly to manually operated vehicles.

It is the object of the present invention to provide a vehicle being easily operated manually by the occupant and which also utilizes in parts the force of gravity for assisting in the propulsion of the vehicle.

It is one of the objects of the present invention to provide a vehicle which may be utilized by cripples, invalids and others and can be readily propelled by them with ease and minimum exertion and it is a further object of the present invention to provide in combination with a vehicle a simple, practicable and inexpensive, manually and gravity operated motor, whereby the occupant may be supported in a swing and his muscular energy utilized in combination with gravity to propel the car. It is understood of course that while the device may be used as a cripple car or vehicle, it is also used for various other uses and therefore not limited in the nature of its service.

With the above objects in view the invention consists in a vehicle provided with a power plant operable by manual and gravity forces and further consists in a novel motor and in the construction and details of the parts and combination and arrangement of the elements as more fully described in the following specification, a form of the invention being illustrated in the accompanying drawings, in which:

Figure 1 is a perspective view of the vehicle.

Fig. 2 a side elevation partly in section to show the details of the operating power plant.

Fig. 3 is a horizontal section showing in plan view parts of the operating mechanism.

Fig. 4 is an enlarged detailed sectional view showing the construction of the carriage and the self grippers thereon.

Figure 1:
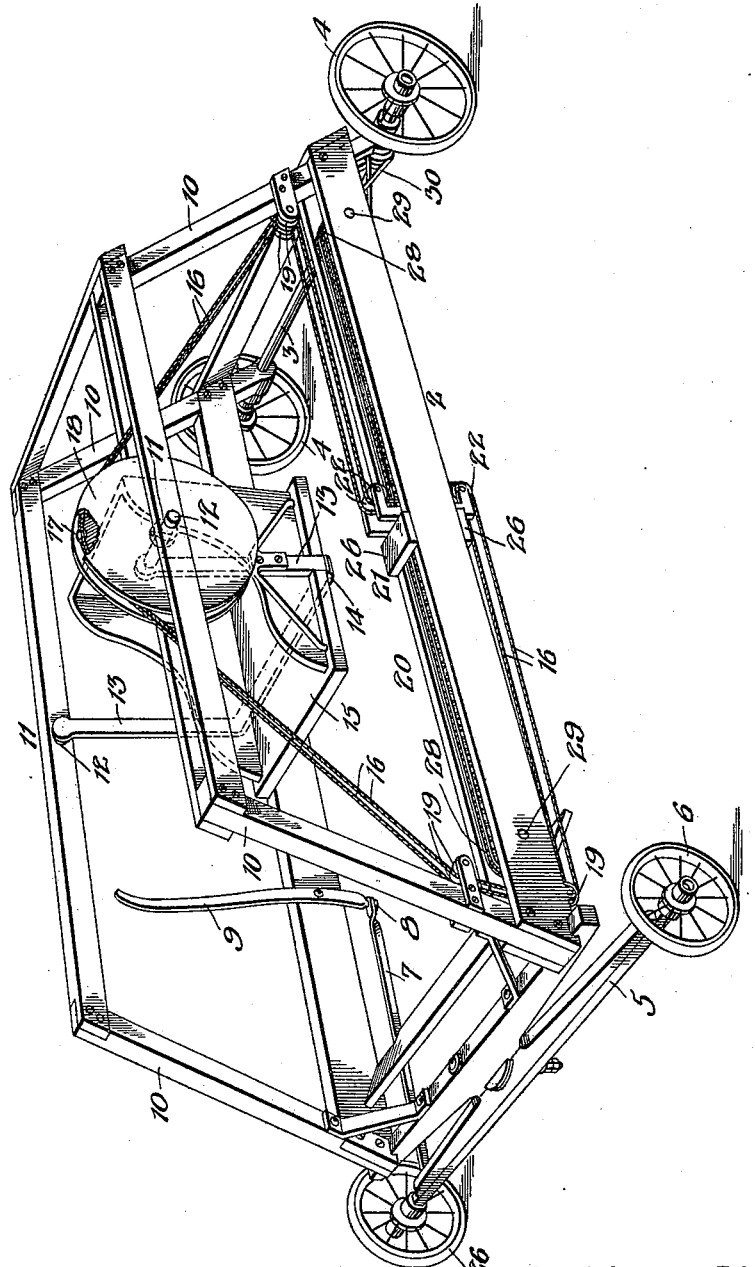

While the present invention may be incorporated in a variety of styles of vehicles, motor cars, or other apparatus, the embodiment here illustrated is incorporated in the form of a vehicle having a suitable underbody or frame 2 the rear end of which is provided with a driven axle 3 having traction wheels 4 thereon, the front end of the body being provided with a suitable form of steering gear, involving the front axle 5 with the wheels 6, which axle may be operated in any suitable manner to secure the proper steering control of the vehicle as shown for instance by connecting to the axle 5 a link 7 pivotally connected at 8 to a lever 9 which may be disposed within convenient reach of the operator of the device. This form of the steering device is only representative as it is obvious that any other appropriate or suitable type of mechanism may be employed for this purpose.

The frame or body 2 is shown as provided on each of its sides with a set of uprights 10 upon which are journaled at 11 pivots or trunnions 12 from which depend side arms 13 having at their lower ends a seat support 14 upon which may be mounted a suitable cushion or other seat 15 the pivoted device constituting substantially a pendulum. When occupied the pendulum is designed to be oscillated by the occupant or occupants. The oscillatory movement of the pendulum is transmitted by a suitable connection shown as a flexible element 16 constituting in this form a chain or cable which is connected at 17 to a lever or pulley 18 rigidly connected to the pendulum arm 13. The ends of the flexible member 16 are guided downwardly through suitable and preferably anti-frictional guide devices as rollers 19, supported upon one of the side frames at 10. Disposed preferably in the vertical plane in which the flexible devices 16 lie, there is slidably mounted upon suitable rails or guides 20 forming a part of or attached to the upright 10 for instance on one side of the vehicle, a carriage generally indicated at 21. This carriage is adapted to be reciprocated in and parallel to the plane of the connection 16 each of which latter is connected, being passed about a suitable guide roller 22, to the swinging end of a gripper or jaw 23 of which two are provided and pivotally supported upon the carriage 21. The jaws 23 in the form of levers are set in close opposition to one another and are automatically relatively opened about their pivot 24 by any suitable device shown in the present instance as comprising a set of springs 25, the ends of which engage the respective jaws 23, the shank of the springs 25 passing downwardly and transversely across the adjacent face of the pivot 24 which forms a part of or is mounted in the carriage 21. This carriage is provided with shoes 26—26 to ride upon parallel upper and lower edges of the rails 20 and adjacent the inner surfaces of the shoes there passes the parallel stretches of an endless flexible member which may be a cable or chain or other suitable device as 27 extending between the parallel rails 20 and lying in the plane of the operating connecting devices 16 or approximately so and are supported upon and drive wheels 28 which may be loosely or securely mounted upon shafts 29 supported in the ends of the rails 20.

The grippers or jaws 23—23 are disposed between the shoes 26 of the carriage 21 and are adapted upon their outward movement relative to each other to frictionally engage and bite the interposed stretches 27$^a$ of the endless member 27 by pressing them alternately against the adjacent surface of the shoes 26—26. Since the jaws 23—23 are normally automatically opened by the spring device 25 and tend to press the interposed stretches of the member 27 to the adjacent portion of the shoes 26 it is preferable that the jaws or grippers be alternately positively disengaged from the adjacent portion of the stretches and for this purpose the ends of the operating connections 16 which are here shown as in the form of bights 16$^a$ are so connected to the jaws 23 that the upper jaw is pulled downwardly against the lower jaw the former being disengaged from the adjacent portion of the cable stretch as the lower jaw is tilted downwardly by pulling on the lower connecting member 16 thereby acting to bind the adjacent portion of the stretch of the endless member 27 against the bridge or shoe portion 26 of the lower part of the carriage and conversely when the upper operating connections 16 is pulled, it, being connected to the lower jaw 23, lifts this latter and releases it from the member 27 and forces the upper jaw 23 against the flexible member 27 and causes its positive frictional engagement with the bridge or shoe portion 26 at the upper part of the carriage. From the foregoing it will be seen that when the occupants of the seat on the pendulum cause the swinging movement of the latter the oscillatory motion of the lever or pulley 18 is transmitted by the connecting devices 16 to the gripper devices 23 which alternately engage with respective adjacent portions of the endless traveling member 27, the carriage 21 being pulled forwardly for instance by the lower connection 16$^a$ and rotary motion is therefor transmitted by the endless flexible member 27 to the rollers or wheels 28 and upon the reverse oscillation of the pendulum the upper connection 16$^a$ is operated alternately to the lower bight, so as to bring the upper jaw 23 upwardly to impinge upon the upper stretch of the member 27 and as the carriage 21 is pulled rearwardly the endless flexible connection 27 is again caused to move in the same direction as it previously moved during the forward advance of the carriage 21.

The rotary motion of the wheels or pulley 28, which are driven by the belt 27, is transmitted to the driving gear of the vehicle in any suitable manner as for instance through means of a sprocket chain or other connecting device 30 passing over a suitable wheel 31 attached to the rear pulley wheel 28 or the shaft 29 thereof as may be preferred and then passing down to another wheel 32 secured on the rear driven axle 3.

What is claimed is:

1. A vehicle comprising a running gear including a driven axle, with traction wheels, and steering wheels, a frame or body on the wheels, a pendulum suspended on the frame or body, and means actuated by the oscillations of the pendulum for driving said axle including a belt and alternately acting grippers engaging the belt.

2. A vehicle comprising a running gear including driven wheels and steering wheels, an oscillating pendulum, and means driven by said pendulum for converting oscillatory movement thereof into rotary movement for the driven wheels including a belt, grippers engaging the belt, a carriage for the grippers, and means for closing the grippers.

3. A vehicle having in combination, a running gear including driven wheels and steering wheels, and a manually and gravity operated power plant connected to said driven wheels including a belt drive, and interacting, reciprocating grippers engaging the belt.

4. A vehicle having, in combination, a running gear including traction wheels and steering wheels, a belt, reciprocating grippers for engaging and driving said belt and traction wheels, and gravity operated means for actuating said means.

5. A vehicle having, in combination, a running gear including traction wheels and steering wheels, a belt, reciprocating means including a carriage with grippers for the belt for driving said traction wheels, and manually and gravity operated means for actuating said reciprocating means.

6. A vehicle having, in combination, a running gear including traction wheels and steering wheels, a belt, reciprocating means for engaging and driving the belt and said traction wheels, and gravity operated oscillatory means for actuating said reciprocating means.

7. In a manually propelled vehicle, a running gear including a driven, wheeled axle, a reciprocating carriage, an endless flexible drive member and supporting wheels for and driven thereby, means for transmitting motion from one of said wheels to the axle, means on said carriage for gripping said member, and a pendulum for actuating the gripping means and reciprocating the carriage.

8. In a manually propelled vehicle, a running gear including a driven, wheeled axle, a reciprocating carriage, an endless flexible drive member and supporting wheels for and driven thereby, means for transmitting motion from said wheels to the axle wheels, means on said carriage for gripping said member, manually and gravity operated means for actuating the gripping means and reciprocating the carriage.

9. In a motor, a pendulum, a reciprocating carriage, an endless, flexible member and rotary means driven thereby and supporting the same, grippers on the carriage for engaging said member, and means connecting the pendulum and said grippers.

10. In a motor, a pendulum, a reciprocating carriage, an endless, flexible member and supporting wheels driven thereby, a pair of grippers on said carriage each engageable with respective stretches of said member, and means connected to said pendulum for alternately actuating said grippers whereby each oscillation of the pendulum is transmitted into unidirectional rotary movement of said wheels.

In testimony whereof we affix our signatures.

MARTIN M. MATSON.
CHARLES M. MATSON.

Copies of this patent may be obtained for five cents each, by addressing the "Commissioner of Patents, Washington, D. C."